United States Patent
Vogel (10) Patent No.: US 9,518,622 B2
(45) Date of Patent: Dec. 13, 2016

(54) CLUTCH DEVICE WITH AN ACTUATING MECHANISM

(71) Applicant: SCHAEFFLER TECHNOLOGIES AG & CO. KG, Herzogenaurach (DE)

(72) Inventor: Florian Vogel, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 48 days.

(21) Appl. No.: 14/401,048

(22) PCT Filed: Jun. 5, 2013

(86) PCT No.: PCT/EP2013/061600
§ 371 (c)(1),
(2) Date: Nov. 13, 2014

(87) PCT Pub. No.: WO2013/186101
PCT Pub. Date: Dec. 19, 2013

(65) Prior Publication Data
US 2015/0122606 A1 May 7, 2015

(30) Foreign Application Priority Data

Jun. 13, 2012 (DE) .................. 10 2012 209 930
Aug. 29, 2012 (DE) .................. 10 2012 215 276

(51) Int. Cl.
*B60L 7/28* (2006.01)
*B60K 6/365* (2007.10)
(Continued)

(52) U.S. Cl.
CPC ............ *F16D 27/14* (2013.01); *B60L 7/28* (2013.01); *B60L 11/14* (2013.01); *B60L 15/2054* (2013.01);
(Continued)

(58) Field of Classification Search
None
See application file for complete search history.

(56) References Cited

U.S. PATENT DOCUMENTS 5,462,496 A * 10/1995 Dick ...................... B60K 17/35
                                                              180/248
5,810,141 A *  9/1998 Organek ................. F16D 13/04
                                                              192/35

(Continued)

FOREIGN PATENT DOCUMENTS

CN        1213049       4/1999
CN      103998811       8/2014

(Continued)

*Primary Examiner* — Mark Manley
(74) *Attorney, Agent, or Firm* — Simpson & Simpson, PLLC (57) ABSTRACT

A clutch device having an actuating device, in particular for a drivetrain of a motor vehicle having an internal combustion engine, an electric machine with a stator and a rotor, and a transmission device, wherein the clutch device can be positioned in the drivetrain between the internal combustion engine on the one side and the electric machine and the transmission device on the other side, the clutch device and the actuating device are integrated into the rotor of the electric machine, and the actuating device has an adjustable ramp device with first ramps and second ramps and a planetary transmission with a ring gear, a sun gear, planet gears and a planet carrier, wherein the first ramps are assigned to the ring gear and the second ramps to the planet carrier, in order to improve the clutch device structurally and/or functionally.

12 Claims, 2 Drawing Sheets

(51) Int. Cl.
  *F16D 27/14*   (2006.01)
  *F16D 23/12*   (2006.01)
  *F16D 27/08*   (2006.01)
  *B60L 11/14*   (2006.01)
  *B60L 15/20*   (2006.01)

(52) U.S. Cl.
  CPC .............. *F16D 23/12* (2013.01); *F16D 27/08* (2013.01); *B60K 6/365* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2260/26* (2013.01); *B60L 2270/145* (2013.01); *F16D 2023/123* (2013.01); *F16D 2300/18* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 6,666,308 | B1* | 12/2003 | De Vries | F16D 65/18 188/156 |
| 7,216,751 | B2* | 5/2007 | Teraoka | F16H 57/04 192/30 W |
| 2002/0086755 | A1* | 7/2002 | Hamai | B60K 6/387 475/5 |
| 2014/0315682 | A1 | 10/2014 | Helmer et al. | |

FOREIGN PATENT DOCUMENTS

| | | |
|---|---|---|
| DE | 102008006062 | 2/2009 |
| DE | 102010048830 | 5/2011 |
| DE | 102009054878 | 6/2011 |
| WO | 2013087055 | 6/2013 |

* cited by examiner

Fig. 2

CLUTCH DEVICE WITH AN ACTUATING MECHANISM

CROSS-REFERENCE TO RELATED APPLICATIONS

The present application is the U.S. national stage application pursuant to 35 U.S.C. §371 of International Application No. PCT/EP2013/061600, filed on Jun. 25, 2013, which application claims priority from German Patent Application Nos. DE 10 2012 209 930.1, filed on Jun. 13, 2012, and DE 10 2012 215 276.8, filed on Aug. 29, 2012, which applications are incorporated herein by reference in their entireties.

TECHNICAL FIELD

The present invention relates generally to a clutch, and, more specifically, to a clutch having an actuating device and, even more specifically, to a clutch for a drivetrain of a motor vehicle having an internal combustion engine.

BACKGROUND

A drive train in a motor vehicle is known from German Patent Application No. DE 10 2008 006 062 A1 as having an internal combustion engine and a starter-generator, where, by means of a starting clutch running in oil, the rotary connection can be produced within the flow of power between the internal combustion engine and the starter-generator (and the transmission). The rotor of the starter-generator is supported—at least indirectly—on a clutch cover, and the clutch cover is non-rotatably connected and oil-tight to the clutch bell housing of the transmission, so as to make the drivetrain more cost-effective and compact.

From German Patent Application No. DE 10 2010 048 830 A1 a clutch unit is known in a drivetrain of a motor vehicle having an internal combustion engine with a crankshaft and a transmission. The transmission is described as having a transmission input shaft with two friction clutches. The first friction clutch includes a first counter-pressure plate and an axially movable first pressing plate non-rotatably received by the first counter-pressure plate. The first pressure plate is braced by a diaphragm spring against the first counter-pressure plate. A first clutch plate with friction linings is interposed between the first pressure plate and the first counter-pressure plate. The first clutch plate is non-rotatably connected to the transmission input shaft. The second friction clutch includes a second counter-pressure plate and an axially movable second pressing plate non-rotatably received by the second counter-pressure plate. The pressing plate is braceable in the direction of the second counter-pressure plate. A second clutch plate with friction linings is interposed between the second pressure plate and the second pressing plate, and is connected to the transmission input shaft. The second counter-pressure plate is described as being operatively connected to the crankshaft, with the first counter-pressure plate being rotatably supported on the second counter-pressure plate, and, an axially operative ramp device being situated between the first counter-pressure plate and the second pressing plate in order to provide an enlarged capacity of transmissible torque with little actuating force.

From the German Patent Application No. DE 10 2011 088 473.4, a clutch device is known having an actuating device for a drivetrain of a motor vehicle having an internal combustion engine, an electric machine with a stator and a rotor, and a transmission device. The clutch device is situated in the drive train between the internal combustion engine on the one side and the electric machine and the transmission device on the other side. The clutch device and the actuating device are integrated into the rotor of the electric machine in order to improve the construction and/or the function of the clutch device.

For more detailed information about the features of the present invention, we refer explicitly to the publication DE 10 2010 048 830 A1 and to the German patent application with file number 10 2011 088 473.4. The teachings of that publication and of that patent application are to be regarded as a component of the present document. Features of that publication and of that patent application are features of the present document. German Publication No. DE 10 2010 048830 A1 and German Patent Application No. 10 2011 088 473.4 are incorporated herein by reference in their entireties.

SUMMARY

According to aspects illustrated herein, there is provided a clutch device for a drivetrain of a motor vehicle having an internal combustion engine, an electric machine with a stator and a rotor, and a transmission device, the clutch device comprising an input part driven by the engine, an output part to provide a torque to the transmission, and, an actuating device operatively arranged within the rotor, the actuating device comprising a planetary gear set having a ring gear, a sun gear, a plurality of planet gears, and a planet carrier, and, an adjustable ramp device having: a first ramp ring frictionally engaged to the ring gear and, a second ramp ring non-rotatably connected to the planet carrier and operatively arranged to move axially with respect to the planet carrier.

An object of the present invention is to improve structurally and/or functionally a clutch device and to reduce the cost of production of a clutch device.

Another object of the present invention is to enable electrical actuation of the clutch.

Another object of the present invention is to reduce the construction space requirement of the clutch device and of the actuating device.

Another object of the present invention is to provide a rotor-integrated clutch device making it possible to connect the internal combustion engine to the drivetrain or to separate it from the drivetrain. In particular, the internal combustion engine capable of being coupled to the drivetrain and a torque of the internal combustion engine is to be transmissible within the shortest time.

Another object of the present invention is to provide a clutch device that is purely electrical in operation, while at the same time actuation energy is kept as low as possible.

Another object of the present invention is to increase the effectiveness of the actuating device.

Another object of the present invention is to enlarge an adjusting range of the ramp device.

In an example embodiment, the internal combustion engine, the clutch device, the electric machine and the transmission device may be arranged in the drivetrain in the named order. A torsional vibration damper, in particular a dual-mass flywheel, may be situated in the drivetrain. The torsional vibration damper may have an input part, an output part which is rotatable relative to the input part, and at least one energy storage device which operates between the input part and the output part. The torsional vibration damper may be situated in the drivetrain between the internal combustion engine and the clutch device. The torsional vibration damper may be situated in the drivetrain between the internal combustion engine and the electric machine. The input part of the torsional vibration damper may be drive-connected to the internal combustion engine. The output part of the torsional vibration damper may be drive-connected to the clutch device. The output part of the torsional vibration damper may be drive-connected to the electric machine. At least one drivable wheel may be situated in the drivetrain. The at least one drivable wheel may be situated in the drivetrain following the transmission device.

In an example embodiment, the motor vehicle may have a hybrid drive. The motor vehicle may have a first energy converter. The first energy converter may be the internal combustion engine. The internal combustion engine may be operable using a hydrocarbon such as gasoline, diesel, natural gas (liquefied natural gas, LNG, or compressed natural gas, CNG), or liquefied petroleum gas (LPG). The internal combustion engine may be operable using hydrogen. The motor vehicle may have a first energy storage device. The first energy storage device may be a fuel tank. The motor vehicle may have a second energy converter. The second energy converter may be the electric machine. The electric machine may be operable as an electric motor. The electric machine may be operable as a generator. The electric machine may structurally unite an electric motor and a generator. The electric machine may be a starter-generator. The motor vehicle may have a second energy storage device. The second energy storage device may be an electric energy storage device. The second energy storage device may be an accumulator. The second energy storage device may be a battery. The energy converters may serve to drive the motor vehicle. Mechanical power may be producible with the aid of the energy converters. The motor vehicle may have a parallel hybrid drive. The motor vehicle may have a full hybrid drive.

In an example embodiment, the clutch device may have a friction clutch. The clutch device may have a dry clutch. The clutch device may have a single disk clutch. The clutch device may have a wet clutch. The clutch device may have a multiple disk clutch. The clutch device may have a multi-plate clutch. The clutch device may have a push clutch. The clutch device may have a pull clutch. The clutch device may have a pressing plate. The clutch device may have at least one intermediate pressure plate. The clutch device may have a pressure plate. The clutch device may have at least one clutch plate. The at least one clutch plate may have friction linings. Intermediate pressure plates and clutch plates may be positioned alternatingly. The at least one clutch plate may be able to be clamped between the pressing plate, the at least one intermediate pressure plate and/or the pressure plate.

In an example embodiment, the clutch device may be situated in the drivetrain between the internal combustion engine and the electric machine. The clutch device may be situated in the drivetrain between the internal combustion engine and the rotor of the electric machine. The clutch device may have an input part and an output part. The input part of the clutch device may have the at least one clutch plate. The input part of the clutch device may be drive-connected to the internal combustion engine. The output part of the clutch device may have the pressing plate, the at least one intermediate pressure plate and/or the pressure plate. The output part of the clutch device may be drive-connected to the electric machine. The output part of the clutch device may be drive-connected to the rotor of the electric machine. The clutch device may be situated in the drivetrain between the internal combustion engine and the transmission device. The output part of the clutch device may be drive-connected to the transmission device. The output part of the clutch device may be drive-connected to an input shaft of the transmission device. The clutch device may be situated in the drivetrain between the torsional vibration damper and the electric machine. The input part of the clutch device may be drive-connected to the torsional vibration damper. The input part of the clutch device may be drive-connected to the output part of the torsional vibration damper. The clutch device may be situated in the drivetrain between the torsional vibration damper and the transmission device.

In an example embodiment, starting from a completely disengaged actuating position, in which there is essentially no transmission of power between the input part and the at least one output part, the clutch device may enable an increasing transmission of power, depending on actuation, all the way to a completely engaged actuating position, in which there is essentially complete transmission of power between the input part and the at least one output part, where a transmission of power between the input part and the at least one output part may take place non-positively, in particular by frictional engagement. Conversely, starting from a completely engaged actuating position, in which there is essentially complete transmission of power between the input part and the at least one output part, a decrease in transmission of power may be enabled, depending on actuation, all the way to a completely disengaged actuating position, in which there is essentially no transmission of power. A completely engaged actuating position may be a closed actuating position. A completely disengaged actuating position may be an open actuating position.

In an example embodiment, the clutch device may have a torque sensor. The torque sensor may be situated at the input part of the clutch device. The torque sensor may have an input part, an output part which is rotatable relative to the input part, and at least one energy storage device which operates between the input part and the output part. A torque may be detectable contrary to a force of the energy storage device, due to a relative rotation between the input part and the output part. The clutch device may be regulated with the help of the torque sensor.

In an example embodiment, the transmission device may have an input shaft and an output shaft. The transmission device may have a multi-step transmission. The transmission device may have a continuously variable transmission. The transmission device may have a dual-clutch transmission. The transmission device may have a torque converter clutch transmission. The transmission device may be a manual transmission. The transmission device may be an automatic transmission. The input shaft may be drive-connected to the electric machine. The input shaft may be drive-connected to the rotor of the electric machine. The input shaft may be drive-connected to the clutch device. The input shaft may be drive-connected to the output part of the clutch device. The output shaft may be drive-connected to the at least one drivable wheel.

In an example embodiment, the electric machine may have a housing. The stator may be fixed in relation to the housing. The stator may be situated radially outside of the rotor. The electric machine may have at least one shaft or hub. The rotor may be fixed on the at least one shaft or hub. The rotor may be situated radially inside of the stator. The electric machine may have a first shaft or hub and a second shaft or hub. The first shaft or hub and the second shaft or hub may be positioned coaxially. The rotor may be fixed on the second shaft or hub. The first shaft or hub may be assigned to the input part of the clutch device. The second shaft or hub may be assigned to the output part of the clutch device. The rotor may have a capsule-like form. The rotor may have the form of a tubular segment. The rotor may have a hollow cylindrical form. A receiving space may be formed in the rotor.

In an example embodiment, a clutch device integrated into the rotor may be a clutch device which is situated at least essentially inside the rotor. A clutch device integrated into the rotor may be a clutch device which is situated radially at least essentially inside the rotor. A clutch device integrated into the rotor may be a clutch device which is situated axially at least essentially inside the rotor. An actuating device integrated into the rotor may be an actuating device which is situated at least essentially inside the rotor. An actuating device integrated into the rotor may be an actuating device which is situated radially at least essentially inside the rotor. An actuating device integrated into the rotor may be an actuating device which is situated axially at least essentially inside the rotor. Sections of the clutch device and the actuating device may be nested within each other. Sections of the actuating device may be situated on a side facing the internal combustion engine. Sections of the clutch device may be situated on a side facing the transmission device. Sections of the actuating device may be situated radially inside. Sections of the clutch device may be situated radially outside.

In an example embodiment, the pressing plate of the clutch device may be movable axially with the help of the actuating device. The clutch device may be opened or closed with the help of the actuating device. The clutch device may be engaged or disengaged with the help of the actuating device. The actuating device may be self-amplifying. This enables shifting of a comparatively high output with comparatively little actuating force. An actuating force may be self-amplified. Thus a reduced actuating energy is needed in order to engage and/or disengage the clutch device. Reduced actuating force is necessary. Reduced actuating travel is necessary. An actuator may have reduced power. An actuator may have reduced power consumption. An actuator may have reduced construction space. An actuator may have reduced weight. A shifting speed may be increased.

In an example embodiment, the ramp device may be adjustable by twisting. The first ramps and the second ramps may be twistable contrary to each other. A twisting of the first ramps and the second ramps contrary to each other may cause a change of an axial interval. There may be rolling elements, in particular balls, situated between the first ramps and the second ramps. The ramps may form running surfaces for the rolling elements. The ramps may be designed as rolling element ramps, in particular as ball ramps. The ramps may be distributed in the circumferential direction of the clutch device. The ramps may be oblique to a plane which is perpendicular to the axis of rotation of the clutch device. The ramps may rise and/or fall in the circumferential direction of the clutch device. The ramps may rise on one side. The ramps may rise on both sides. The first ramps and the second ramps may be designed so as to be geometrically complementary to each other. The first ramps may correspond to the second ramps in such a way that when the first ramps and the second ramps are twisted contrary to each other, the first ramps and the second ramps move away from each other or toward each other in the direction of extension of the axis of rotation of the clutch device. The first ramps may support the rolling elements from radially inside. The second ramps may support the rolling elements from radially outside. The rolling elements may have a diameter such that they are held safe from loss between the first ramps and the second ramps. The rolling elements may be situated in a rolling element cage. This ensures an assignment of the rolling elements to the ramps.

In an example embodiment, the epicyclic gear system may be a planetary gear system. The ring gear may have internal toothing. The sun gear may have external toothing. The planet gears may each have external toothing. The planet gears may each be engaged with the ring gear or with the sun gear. The epicyclic gear system may have a first transmission shaft, a second transmission shaft and a third transmission shaft. The ring gear may be situated on the first transmission shaft. The sun gear may be situated on the second transmission shaft. The planet gears may be situated on the third transmission shafts. The first transmission shaft and the second transmission shaft may have coaxial axes. The axes of the third transmission shaft may be parallel to the axes of the first transmission shaft and the second transmission shaft, and spaced apart from them. During operation of the epicyclic gear system, the planet gears may circulate around the sun gear. The link may be a planet gear carrier. The link may connect the third transmission shafts firmly to each other, or may contain the third transmission shafts.

In an example embodiment, the clutch device according to the invention, having the actuating device, may be accommodated in the rotor of the electric machine. An electrical actuation of the clutch device is made possible. A construction space requirement of the clutch device and of the actuating device is reduced. A cost of production is reduced. A rotor-integrated clutch device is provided, which makes it possible to connect the internal combustion engine to the drivetrain or to separate it from the drivetrain. With the help of the clutch device according to the invention, within the shortest time the internal combustion engine can be coupled to the drivetrain and a torque of the internal combustion engine is transmissible. An example embodiment of the clutch device according to the invention is operable purely electrically; at the same time, actuating energy is kept as low as possible. An effectiveness of the actuating device is increased. An adjusting range of the ramp device is enlarged.

In an example embodiment, the first ramps may be firmly connected to the ring gear, the second ramps may be non-rotatably connected to the planet carrier and axially pre-tensioned with the help of at least one leaf spring, and the planet carrier may be firmly connected to the rotor. The ramp device may have a first ramp ring. The first ramp ring may contain the first ramps. The first ramp ring may initially be structurally separated, and subsequently connected to the ring gear. The first ramps may be integrated into the ring gear. The first ramps may be sections of the ring gear. The ramp device may have a second ramp ring. The second ramp ring may contain the second ramps. The second ramp ring may initially be structurally separated, and subsequently connected to the planet carrier. The at least one leaf spring may be a tension spring. The at least one leaf spring may have an annular form. The at least one leaf spring may be connected to the first ramp ring on the one side and to the second ramp ring on the other side. With the help of the at least one leaf spring, the ramp device may be subjected to a pre-stressing force. The planet carrier may be produced with the rotor in a single piece. The planet carrier and the rotor may initially be produced structurally separately and subsequently connected to each other.

In an example embodiment, the planetary transmission may have pairs of planet gears, having first planet gears to make a first gear ratio change with the sun gear and second planet gears to make a second gear ratio change with the ring gear. In each case, there may be a first planet gear and a second planet gear assigned to each other. The planet gears assigned to each other may be situated coaxially to each other. The planet gears assigned to each other may be spaced axially apart from each other. The planet gears within a pair may be non-rotatably connected to each other. Planet gear pairs may each have a first planet gear to make a first gear ratio with the sun gear, and a second planet gear to make a second gear ratio with the ring gear. The first planet gears may have a larger diameter than the second planet gears. A gear ratio of the planetary transmission is increased thereby.

In an example embodiment, the components on the ring gear side make up a first set of components, and the components on the sun gear side make up a second set of components that. The first set of components may rotate with the ring gear, and the second set of components may rotate with the sun gear. The first and second sets may have an at least approximately equal moment of inertia. The moments of inertia may be at least approximately equal, when allowance is made for a gear ratio change of the planetary transmission. This reduces, or prevents, an influence of angular acceleration on the actuating device, in particular an unintended disengagement or engagement of the clutch device.

In an example embodiment, the clutch device may have a pressing plate, and the planet carrier may be assigned to the pressing plate. The pressing plate and the planet carrier may be non-rotatably connected to each other. The pressing plate may be movable axially to a limited extent relative to the planet carrier. The planet carrier may be integral with the second ramp ring, i.e., the planet carrier may be produced in a single piece with the second ramp ring. The pressing plate and the second ramp ring may initially be produced structurally separately and subsequently connected to each other.

In an example embodiment, the actuating device may have a torque sensor for controlled adjustment of the ramp device, and a freewheeling device, and the torque sensor and the freewheeling device may be arranged at least partially overlapping in the radial direction. The freewheeling device may have an inner ring and an outer ring. The freewheeling device may have clamping elements. The clamping elements may act between the inner ring and the outer ring. With the help of the freewheeling device, rotation of the inner ring and outer ring relative to each other may be enabled in a first direction of rotation, and blocked in a second direction of rotation which is opposed to the first direction of rotation. The inner ring may be assigned to a shaft or hub of the electric machine. The outer ring may be assigned to the sun wheel of the planetary transmission. This makes self-regulation of the actuating device possible in the completely engaged actuating position of the clutch device. Push operation of the internal combustion engine is made possible. The torque sensor may have at least one torque spring, in particular a helical compression spring, and the torque spring and the freewheeling device may be arranged at least partially overlapping in the radial direction.

In an example embodiment, the actuating device may have an electric actuator. The actuator may act upon the sun gear. With the help of the actuator, the sun gear may have a pilot torque applied to it. The electric actuator may be an eddy current brake. The actuating device may have an eddy current brake to engage the clutch device. An electric control device may be provided to actuate the eddy current brake. With the help of the eddy current brake, the sun gear may have a torque applied to it which acts contrary to a rotation of the epicyclic gear system, in such a way that the ring gear with the first ramps and the planet carrier with the second ramps rotate relative to each other.

In an example embodiment, the control device may be adjustably movable between a completely open actuating position, intermediate positions, and a completely closed actuating position. An adjusted repositioning may take place with the help of a control device. At least one output signal may be issuable by the control device. An output signal may be issuable by the control device to the actuator of the clutch device. The control device may have at least one input signal available. At least one parameter may be stored in the control device. At least one parameter may be ascertainable with the help of the control device. The at least one output signal may be generated on the basis of the at least one input signal, at least one stored parameter, and/or at least one ascertained parameter.

In an example embodiment, the clutch device may be self-regulating in the completely closed actuating position. A pilot torque for closing the clutch device may be provided by the internal combustion engine. The sun gear of the epicyclic gear system may have a torque produced by the internal combustion engine applied to it. This may be applied to the clutch device in the closing direction. This makes it unnecessary to actuate the clutch device with the help of the electric actuator in order to maintain the closed actuating position. Electric energy is not necessary.

In summary, and portrayed in other words, the present invention yields, among other things, a rotor-integrated clutch with electric actuation. The clutch may be placed in a rotor of an e-motor of a hybrid. The clutch may ensure a disconnecting or connecting of an e-machine with a combustion engine. At the same time, the following operating states may be attained by the clutch: during purely electrical driving, the clutch may be disengaged and the internal combustion engine may be uncoupled from a drivetrain (internal combustion engine off). If more power or torque is needed, the internal combustion engine may be started by partially engaging the clutch via the e-motor. The clutch may go into a pushing mode in order to start the internal combustion engine. The torque which the clutch transmits may be precisely regulated in this state. This may occur by means of an electric actuator with variably adjustable torque. The torque may be realizable by means of an eddy current brake, which applies a requested pilot torque without wear and thus always applies the same torque over the entire life. The torque of the eddy current brake may be amplified through a planetary gear set. When the internal combustion engine is running, the clutch may engage itself by means of the freewheeling mechanism and the planetary gear set, in order to transmit the torque of the internal combustion engine into the drivetrain. In this state, the clutch can be self-regulating, and may not require any additional electric energy. In this state, driving states such as boosting, recuperation, load point shifting and pure driving may be realizable with the internal combustion engine. The clutch can disengage as soon as the speed of rotation of the rotor become less than or equal to the speed of the internal combustion engine.

These and other objects, advantages and features of the present invention will be better appreciated by those having ordinary skill in the art in view of the following detailed description of the invention in view of the drawings.

BRIEF DESCRIPTION OF THE DRAWINGS

Exemplary embodiments of the present invention will be described in greater detail below in reference to figures. This description will yield additional features and advantages. Concrete features of these exemplary embodiments may depict general features of the present invention. Features of these exemplary embodiments combined with other features may also represent individual features of the present invention.

The figures show the following, schematically and by way of example.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

An axial direction is a direction of extension of an axis of rotation of the electric machine.

A radial direction is a direction perpendicular to an axis of rotation of the electric machine.

The terms "input part" and "output part" are in reference to a power stream coming from the internal combustion engine, or, in other words, in reference to a power stream directed toward a drivable wheel of the motor vehicle. The terms "input shaft" and "output shaft" are in reference to a power stream coming from the internal combustion engine or from the electric machine.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1:
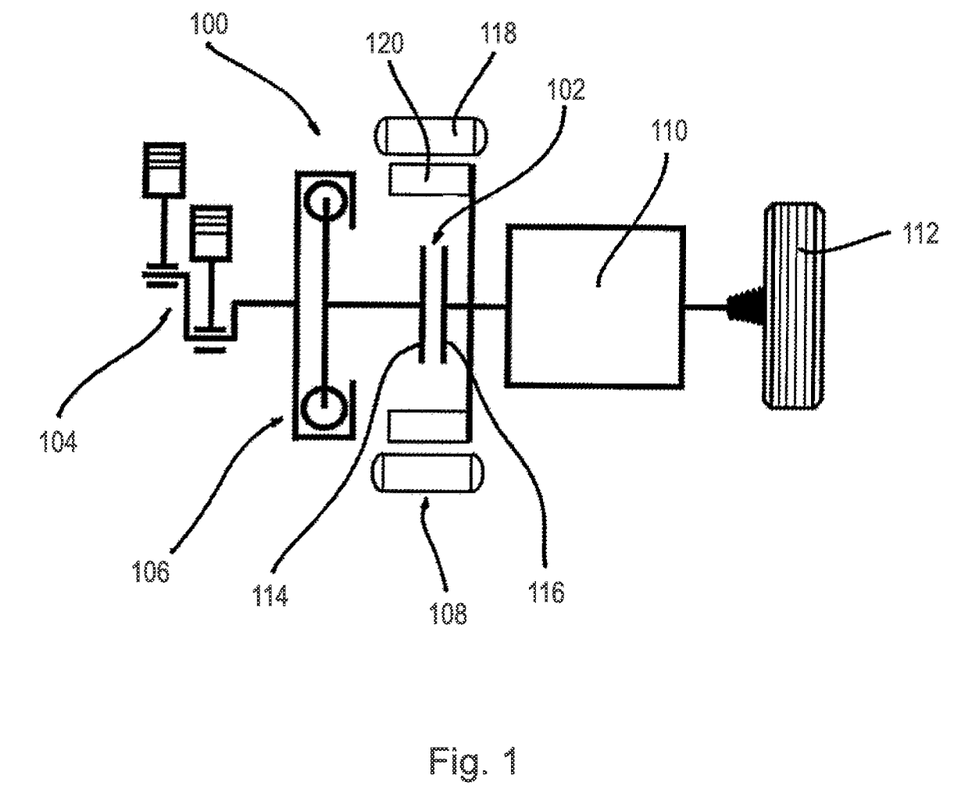
FIG. 1 is a schematic of a drivetrain of a motor vehicle having a parallel fully hybrid drive and a clutch situated in the drivetrain according to an example embodiment; and, FIG. 2 is a cross-section of a perspective view of a clutch with an actuating device according to an example embodiment, integrated into a rotor of an electric machine, for a motor vehicle having a hybrid drive.

FIG. 1 shows drivetrain 100 of a motor vehicle, of which no other details are shown here, having a parallel fully hybrid drive and clutch 102 situated in drivetrain 100. Drivetrain 100 has internal combustion engine 104, dual-mass flywheel 106, clutch 102, electric machine 108, transmission 110 and at least one drivable wheel 112. Electric machine 108 is operable as a motor. Clutch 102 is situated in drivetrain 100 between dual-mass flywheel 106 and electric machine 108. Clutch 102 is situated in drivetrain 100 between dual-mass flywheel 106 and transmission 110.

Clutch 102 has input part 114 and output part 116. Input part 114 of clutch 102 is connected to dual-mass flywheel 106. Output part 116 of clutch 102 is connected to electric machine 108. Electric machine 108 has stator 118 and rotor 120. Output part 116 of clutch 102 is connected to rotor 120 of electric machine 108. Output part 116 of clutch 102 is connected to transmission 110. Electric machine 108 is connected to transmission 110. Output part 120 of clutch 108 is connected to transmission 110.

Figure 2:
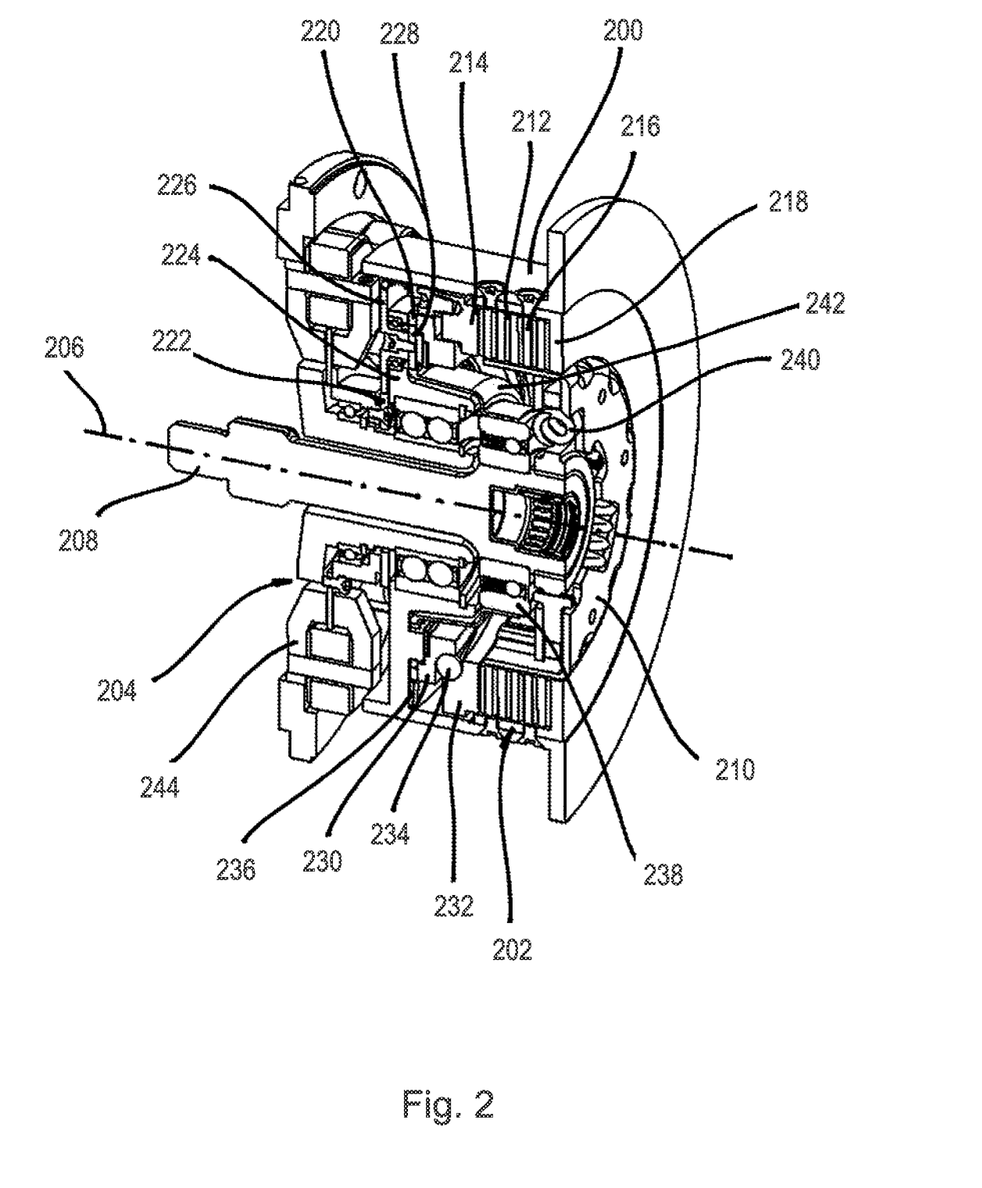

FIG. 2 shows an example embodiment of the present invention. Clutch 202 is integrated into rotor 200 of an electric machine having actuating device 204. The electric machine may be for a motor vehicle with a hybrid drive. Clutch 202 is situated in the direction of extension of axis of rotation 206, as well as in the radial direction within rotor 200. Actuating device 204 is situated in the direction of extension of axis of rotation 206, as well as in the radial direction within rotor 200. Clutch 202 and actuating device 204 are nested within each other. Clutch 202 is situated on the internal combustion engine side. Actuating device 204 is situated on the transmission side.

Clutch 202 has an input part and an output part. The input part has shaft 208, torque sensor 210, and clutch plates, such as 212. The output part of clutch 202 has pressing plate 214, intermediate pressure plates, such as 216, and pressure plate 218. Clutch plates 212 are non-rotatably connected to shaft 208. Pressing plate 214, intermediate pressure plates 216 and pressure plate 218 are non-rotatably connected to rotor 200. Pressing plate 214 can move axially to a limited extent in the direction of extension of axis of rotation 206.

Actuating device 204 has a planetary gear set having ring gear 220, sun gear 222, planet gears, and a planet carrier 224. Ring gear 220 has internal toothing. Sun gear 222 has external toothing. The planet gears each have external toothing. The planetary gear set has first planet gears, such as 226, which make a first gear ratio change with sun gear 222. The planetary gear set has second planet gears, such as 228, which make a second gear ratio change with ring gear 220. In each case, first planet gear 226 and second planet gear 228 are non-rotatingly connected to each other. First planet gears 226 in each case have a larger diameter than second planet gears 228. Planet gears 226, 228 are supported in planet carrier 224.

Actuating device 204 has a ramp device, with first ramp ring 230 and second ramp ring 232. First ramp ring 230 has first ramps. Second ramp ring 232 has second ramps. First ramp ring 230 and second ramp ring 232 are rotatable relative to each other. Rolling elements such as 234 are situated between first ramp ring 230 and second ramp ring 232. Rotating ramp rings 230 and 232 relative to each other causes a change of spacing between ramp rings 230 and 232. Ramp rings 230 and 232 are connected to each other through the planetary transmission. First ramp ring 230 is firmly connected to ring gear 220. Second ramp ring 232 is connected non-rotatably to planet carrier 224, and to planet carrier 224 so that it is axially movable. Second ramp ring 232 is connected to planet carrier 224 with the help of annular leaf springs, such as 236. Leaf springs 236 act as tension springs between planet carrier 224 and ramp ring 232. Planet carrier 224 is firmly connected to rotor 200.

Actuating device 204 has torque sensor 210 and freewheeling mechanism 238. Torque sensor 210 serves to provide regulated adjustment of the ramp device. Torque sensor 210 has an input part and an output part. The input part of torque sensor 210 is non-rotatably connected to shaft 208. The output part of torque sensor 210 is non-rotatably connected to clutch plates 212. Helical compression springs, such as 240, are operative between the input part and the output part of torque sensor 210.

Freewheeling mechanism 238 has an inner ring and an outer ring. Freewheeling mechanism 238 has clamping elements. The inner ring of freewheeling mechanism 238 is non-rotatably connected to shaft 238208. The outer ring of freewheeling mechanism 238 is non-rotatably connected to sleeve-shaped component 242, which corresponds to second planet gears 228.

Torque sensor 210 and freewheeling mechanism 238 are situated next to each other in the direction of extension of axis of rotation 206. Torque sensor 210 and freewheeling mechanism 238 overlap in the radial direction. Helical compression springs 240 and freewheeling mechanism 238 overlap partially in the radial direction. The input part of torque sensor 210 and the inner ring of freewheeling mechanism 238 have at least approximately the same inside diameter. Torque sensor 210 and freewheeling mechanism 238 are situated in the direction of extension of axis of rotation 206 within clutch 202. Torque sensor 210 and freewheeling mechanism 238 are situated radially within clutch 202.

Actuating device 204 has eddy current brake 244. Eddy current brake 244 has a brake stator and a brake rotor. The brake stator and the brake rotor are situated one on top of the other in the radial direction. The brake stator is situated radially on the outer side of the brake rotor. The brake stator has a plurality of coils and armatures. The armatures have a clamp-like form in each case, with a back section and two finger sections. The coils are situated in each case on the back section of an armature. The coils each have a winding axis, which is situated parallel to axis of rotation 206. The back sections of the armatures run parallel in each case to axis of rotation 206. The brake stator is firmly connected to rotor 200. The brake rotor has a disk-like form. The brake rotor has a disk-like metal plate. The brake rotor is non-rotatably connected to sun gear 222. The armatures of the brake stator clasp the brake rotor in each case in a clamp-like manner. The armatures of the brake stator clasp the brake rotor in each case with the finger sections. This enables a pilot torque to be introduced through sun gear 222 to actuate clutch 202. The planetary transmission is situated so that the pilot torque is amplified.

When driving is purely electrical, clutch 202 is disengaged. Ring gear 220, planet carrier 224, planet gears 226 and 228, and sun gear 222 run at the same speed of rotation (e-motor speed); the planetary transmission is "blocked," so to speak. This prevents twisting of ramp rings 230 and 232 and operation of clutch 202. In addition, an influence of rotation accelerations is nearly eliminated because the components which rotate with ring gear 220 have approximately the same moment of inertia as the components which rotate with sun gear 222.

In order to start the internal combustion engine, a pilot torque for clutch 202 must be produced on sun gear 222 by eddy current brake 244. This torque is a braking torque, and acts contrary to the original rotary motion. Sun gear 222 is rotated relative to the formerly stationary planetary transmission. Through the function of the planetary transmission, ring gear 220, and hence also ramp ring 230, are rotated relative to planet carrier 224, which simultaneously corresponds to rotation of the ramp device and engagement of clutch 202.

The pilot torque of eddy current brake 244 is transmitted by the gear ratio formed at the planetary transmission and at ramp rings 230 and 232 in such a way that the internal combustion engine can be started with the requested torque. The pilot torque can be controlled precisely by means of the supply of electric power at eddy current brake 244, and can be built up in a very short time. The starting time of the internal combustion engine is a few milliseconds. The high transmission ratio of the torque coupled with the short actuating time results in little actuating energy for starting the internal combustion engine. Furthermore, eddy current brake 244 is free of wear, and is able through a magnetic field of an electromagnet to realize any desired intermediate levels of the required torque, without torque fluctuations and dependencies on coefficients of friction.

When the internal combustion engine is running, the pilot torque is generated by means of the internal combustion engine itself and freewheeling mechanism 238. Shaft 208 serves to connect the internal combustion engine to freewheeling mechanism 238. In this operating state, clutch 202 transmits a torque in the direction of traction. A certain part of this traction torque is used by means of freewheeling mechanism 238 as pilot torque for component 242. Clutch 202 is thereby actuated by part of the torque of the internal combustion engine on ramp rings 230 and 232 through the planetary transmission. Clutch plates 212 are clamped between pressing plate 214, intermediate pressure plates 216 and pressure plate 218, and transmit the required torque. The torsional angle of ramp rings 230 and 232 is regulated by means of torque sensor 210. Torque sensor 210 also makes it possible for clutch 202 to disengage as soon as there is no longer any torque being transmitted. Because of this arrangement of the components, clutch 202 is self-regulating in this state, and needs no additional external energy for actuation. In this state, operating states such as load shifting, boosting and driving are possible using the internal combustion engine. Pushing operation of the internal combustion engine is also possible for the system. In this case eddy current brake 244 is operated in continuous mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

100 Drivetrain
102 Clutch
104 Internal combustion engine
106 Dual-mass flywheel
108 Electric machine
110 Transmission
112 Wheel
114 Input part
116 Output part
118 Stator
120 Rotor
200 Rotor
202 Clutch
204 Actuating device
206 Axis of rotation
208 Shaft
210 Torque sensor
212 Clutch plate
214 Pressing plate
216 Intermediate pressure plate
218 Pressure plate
220 Ring gear
222 Sun gear
224 Planet carrier
226 First planet gear 228 Second planet gear
230 First ramp ring
232 Second ramp ring
234 Rolling element
236 Leaf spring
238 Freewheeling mechanism
240 Helical compression spring
242 Component
244 Eddy current brake

The invention claimed is:

1. A clutch device for a drivetrain of a motor vehicle having an internal combustion engine, an electric machine with a stator and a rotor, and a transmission device, the clutch device comprising:
    an input part driven by the engine;
    an output part to provide a torque to the transmission; and,
    an actuating device operatively arranged within the rotor, the actuating device comprising:
        a planetary gear set having a ring gear, a sun gear, a plurality of planet gears, and a planet carrier; and,
        an adjustable ramp device having:
            a first ramp ring frictionally engaged to the ring gear; and,
            a second ramp ring non-rotatably connected to the planet carrier and operatively arranged to move axially with respect to the planet carrier to engage the clutch, connecting the input part to the output part, wherein the actuating device has an eddy current brake to engage the clutch device.

2. The clutch device of claim 1, further comprising a leaf spring operatively arranged to bias the second ramp ring toward the planet carrier axially, and, wherein the planet carrier is non-rotatably connected to the rotor.

3. The clutch device of claim 1, wherein the planetary transmission has a plurality of planet gear pairs, each pair having a first planet gear to make a first gear ratio with the sun gear, and a second planet gear to make a second gear ratio with the ring gear.

4. The clutch device of claim 3, wherein the first planet gear has a first diameter larger than a second diameter of the second planet gear.

5. The clutch device of claim 1, wherein:
    a first set of components rotates with the ring gear and comprises the first ramp ring;
    a second set of components rotates with the sun gear and comprises the second ramp ring; and,
    the first set has a first moment of inertia substantially equal to a second moment of inertia of the second set.

6. The clutch device of claim 1, further comprising a pressing plate non-rotatably connected to the planet carrier.

7. The clutch device of claim 1, wherein the actuating device has a torque sensor for regulated adjustment of the ramp device, and a freewheeling device, and, the torque sensor and the freewheeling device are arranged at least partially overlapping in the radial direction.

8. The clutch device of claim 7, wherein the torque sensor has at least one torque spring arranged to at least partially overlap the freewheeling device in the radial direction.

9. The clutch device of claim 8, wherein the torque spring is a helical compression spring.

10. The clutch device of claim 1, wherein the eddy current brake enables a torque to be applied to the sun gear such that the first ramp ring, connected to the ring gear, rotates in a first direction while the second ramp ring, connected to the planet carrier, rotates in a second direction contrary to the first direction.

11. A clutch device for a drivetrain of a motor vehicle having an internal combustion engine, an electric machine with a stator and a rotor, and a transmission device, the clutch device comprising:
    an input part driven by the engine;
    an output part to provide a torque to the transmission; and,
    an actuating device operatively arranged within the rotor, the actuating device comprising:
        a planetary gear set having a ring gear, a sun gear, a plurality of planet gears, and a planet carrier;
        a pressing plate non-rotatably connected to the planet carrier; and,
        an adjustable ramp device having:
            a first ramp ring frictionally engaged to the ring gear; and,
            a second ramp ring non-rotatably connected to the planet carrier and operatively arranged to move axially with respect to the planet carrier to engage the clutch, connecting the input part to the output part.

12. A clutch device for a drivetrain of a motor vehicle having an internal combustion engine, an electric machine with a stator and a rotor, and a transmission device, the clutch device comprising:
    an input part driven by the engine;
    an output part to provide a torque to the transmission; and,
    an actuating device operatively arranged within the rotor, the actuating device comprising:
        a planetary gear set having a ring gear, a sun gear, a plurality of planet gears, and a planet carrier; and,
        an adjustable ramp device having:
            a first ramp ring frictionally engaged to the ring gear; and,
            a second ramp ring non-rotatably connected to the planet carrier and operatively arranged to move axially with respect to the planet carrier to engage the clutch, connecting the input part to the output part, wherein the actuating device has a torque sensor for regulated adjustment of the ramp device, and a freewheeling device, and, the torque sensor and the freewheeling device are arranged at least partially overlapping in the radial direction.

* * * * *